(12) United States Patent
Takahashi

(10) Patent No.: US 9,701,834 B2
(45) Date of Patent: Jul. 11, 2017

(54) BLEND OF ACRYLONITRILE/STYRENE COPOLYMER WITH BUTADIENE PARTICLES

(71) Applicant: FUJI XEROX CO., LTD., Tokyo (JP)

(72) Inventor: Megumi Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/624,928

(22) Filed: Feb. 18, 2015

(65) Prior Publication Data

US 2016/0060457 A1    Mar. 3, 2016

(30) Foreign Application Priority Data

Aug. 28, 2014    (JP) ................................. 2014-174480

(51) Int. Cl.
*C08L 25/12* (2006.01)
*C08L 69/00* (2006.01)
*C08L 9/00* (2006.01)

(52) U.S. Cl.
CPC ................. *C08L 69/00* (2013.01); *C08L 9/00* (2013.01); *C08L 25/12* (2013.01); *C08L 2205/03* (2013.01); *C08L 2205/22* (2013.01)

(58) Field of Classification Search
None
See application file for complete search history.

(56) References Cited

U.S. PATENT DOCUMENTS

| | | | | |
|---|---|---|---|---|
| 3,658,947 A | * | 4/1972 | Ito | C08F 279/04 264/175 |
| 5,484,846 A | * | 1/1996 | Wittman | C08L 51/04 525/133 |
| 5,955,540 A | * | 9/1999 | Dion | C08F 279/02 525/316 |

FOREIGN PATENT DOCUMENTS

| JP | B-55002357 | * | 1/1980 |
|---|---|---|---|
| JP | 2000109589 A | | 4/2000 |
| JP | 2000248148 A | | 9/2000 |
| JP | 2003138093 A | | 5/2003 |

OTHER PUBLICATIONS

Motta, The Effect of Copolymerization on Transition Temperatures of Polymeric Materials; Journal of Thermal Analysis vol. 49 (1997) pp. 461-464.*

* cited by examiner

*Primary Examiner* — David Buttner
(74) *Attorney, Agent, or Firm* — Oliff PLC

(57) ABSTRACT

A resin composition includes butadiene rubber particles having an average particle diameter in a range of 1 μm to 2 μm, and an acrylonitrile-styrene copolymer resin.

9 Claims, No Drawings

BLEND OF ACRYLONITRILE/STYRENE COPOLYMER WITH BUTADIENE PARTICLES

CROSS-REFERENCE TO RELATED APPLICATIONS

This application is based on and claims priority under 35 USC 119 from Japanese Patent Application No. 2014-174480 filed Aug. 28, 2014.

BACKGROUND

1. Technical Field

The invention relates to a resin composition and a resin molded article.

2. Related Art

As components of electrical goods or electrical and electronic apparatuses, polymer materials such as polystyrene, a polystyrene-ABS resin copolymer, polycarbonate, polyester, polyphenylene sulfide, and polyacetal are used since they have excellent heat resistance and excellent mechanical strength, and particularly, in the case of the components of the electrical and electronic apparatuses, the polymer materials are used since they maintain excellent mechanical strength against environmental change.

Resin compositions containing these polymer materials and molded articles obtained by using the resin compositions are reviewed in various ways.

SUMMARY

According to an aspect of the invention, there is provided a resin composition including:

butadiene rubber particles having an average particle diameter in a range of 1 μm to 2 μm; and an acrylonitrile-styrene copolymer resin.

DETAILED DESCRIPTION

Exemplary embodiments of the invention are described. The exemplary embodiments are presented as an example for carrying out the invention. The invention is not limited thereto.

A resin composition according to the exemplary embodiment of the invention contains butadiene rubber particles having an average particle diameter of 1 μm to 2 μm and an acrylonitrile-styrene copolymer resin. The resin composition according to the exemplary embodiment has excellent fatigue resistance and excellent impact resistance when a molded article is formed, since the resin composition contains the butadiene rubber particles having the average particle diameter of 1 μm to 2 μm and an acrylonitrile-styrene copolymer resin.

The acrylonitrile-butadiene rubber-styrene resin (ABS resin) used for housings of an OA apparatus and the like is required to have impact resistance, flame retardance, and heat resistance. Therefore, in order to provide these characteristics together, various impact modifying agents and flame retardants have been reviewed. Since opening and closing operations are repeatedly performed in housings in some cases, the housings require fatigue resistance in addition to the characteristics described above. Recently, life spans of OA apparatuses have been increased due to the decrease of failure rates, so the fatigue resistance has been strictly required. In addition, since the thickness of components have become thinner in order to reduce weight and costs, impact resistance has also been strictly required.

It is considered that an amount of butadiene in an acrylonitrile-butadiene rubber-styrene resin contributes to both fatigue resistance and impact resistance, but the amount of butadiene has a contrasting relationship with the flame retardance or the fluidity for molding a thin component, so the scope for adjusting the amount of butadiene in order to obtain desired physical properties is limited. The inventors of the invention have found that fatigue resistance and impact resistance become excellent when being formed into a molded article, when the resin composition that contains the acrylonitrile-butadiene rubber-styrene resin is caused to contain butadiene rubber particles having an average particle diameter in a specific range of 1 μm to 2 μm. If the particle diameters of the butadiene rubber particles are great, the impact resistance decreases and when a large impact is applied, cracks easily form. On the contrary, if the particle diameters of the butadiene rubber particles are small, an absorption amount of the impact energy generated by the deformation caused when an impact corresponding to a fraction of yield stress received is small, and the fatigue resistance becomes small.

Acrylonitrile-Styrene Copolymer Resin

The resin composition according to the exemplary embodiment contains the acrylonitrile-butadiene rubber-styrene resin obtained by blending the butadiene rubber particle to the acrylonitrile-styrene copolymer resin, as the resin component. Impact resistance or the like is enhanced by containing the acrylonitrile-butadiene rubber-styrene resin.

The acrylonitrile-styrene copolymer resin is a copolymer of acrylonitrile and styrene.

As the acrylonitrile-styrene copolymer resin, a synthesized product or a commercially available product may be used. Examples of the commercially available product include "100PCF" manufactured by Nippon A&L Inc., and "T8701" manufactured by Asahi Kasei Chemicals Corporation. In addition, the acrylonitrile-styrene copolymer resin may be used singly, or two or more types thereof may be used in combination.

The molecular weight of the acrylonitrile-styrene copolymer resin is not particularly limited. However, according to the exemplary embodiment, the weight-average molecular weight of the acrylonitrile-styrene copolymer resin is preferably in a range of 50,000 to 150,000, and more preferably in a range of 60,000 to 130,000. If the weight-average molecular weight of the acrylonitrile-styrene copolymer resin is less than 50,000, workability may decrease due to the excessive fluidity. If the weight-average molecular weight of the acrylonitrile-styrene copolymer resin is greater than 150,000, workability may decrease due to insufficient fluidity.

The glass transition temperature of the acrylonitrile-styrene copolymer resin is not particularly limited. However, the glass transition temperature is preferably in a range of 100° C. to 130° C., and more preferably in a range of 105° C. to 120° C. If the glass transition temperature of the acrylonitrile-styrene copolymer resin is less than 100° C., heat resistance when being formed into a molded article may be insufficient. If the glass transition temperature of the acrylonitrile-styrene copolymer resin is greater than 130° C., workability may be insufficient.

Butadiene Rubber Particle

The resin composition according to the exemplary embodiment contains butadiene rubber particles having an average particle diameter in a range of 1 μm to 2 μm.

The average particle diameter of the butadiene rubber particles is in a range of 1 µm to 2 µm, and preferably in a range of 1.2 µm to 1.8 µm. If the average particle diameter of the butadiene rubber particles is less than 1 µm, the fatigue resistance decreases, and if the average particle diameter is greater than 2 µm, the impact resistance decreases.

The constituent of the butadiene rubber particles contains butadiene as a main component. The content of the butadiene is preferably 80% by weight or greater with respect to the total constituent, and more preferably 90% by weight or greater. It is particularly preferable that only butadiene is the constituent (that is, the content is 100% by weight). If the butadiene in the butadiene rubber particles is less than 80% by weight with respect to the total constituent, sufficient impact resistance may not be obtained.

The content of the butadiene rubber particle is preferably in a range of 2% by weight to 80% by weight with respect to the content of the acrylonitrile-styrene copolymer resin, and more preferably in a range of 8% by weight to 25% by weight. If the content of the butadiene rubber particle is less than 2% by weight with respect to the content of the acrylonitrile-styrene copolymer resin, sufficient impact resistance may not be obtained, and if the content of the butadiene rubber particle is greater than 80% by weight, the workability becomes insufficient, or sufficient chemical resistance may not be obtained.

Polycarbonate Resin

The resin composition according to the exemplary embodiment may contain a polycarbonate resin as the resin component. Impact resistance, flame retardance, and the like are enhanced by containing the polycarbonate resin. The polycarbonate resin is not particularly limited, as long as the polycarbonate resin is a polymer which is by polycondensation of one or more monomers and has at least one carbonate group. Examples of the polycarbonate resin include an aromatic polycarbonate resin such as bisphenol A-type polycarbonate, bisphenol S-type polycarbonate, and biphenyl-type polycarbonate.

As the polycarbonate resin, a synthesized product or a commercially available product may be used. Examples of the commercially available product include "L-1250Y" and "AD5503" manufactured by Teijin Limited, "A2200" manufactured by Idemitsu Kosan Co., Ltd., and "Iupilon S2000" manufactured by Mitsubishi Engineering-Plastics Corporation (aromatic polycarbonate resin). In addition, the polycarbonate resin may be used singly, or two or more types thereof may be used in combination.

The molecular weight of the polycarbonate resin is not particularly limited. However, according to the exemplary embodiment, the weight-average molecular weight of the polycarbonate resin is preferably in a range of 5,000 to 30,000, and more preferably in a range of 10,000 to 25,000. If the weight-average molecular weight of the polycarbonate resin is less than 5,000, workability may decrease due to the excessive fluidity, and if the weight-average molecular weight of the polycarbonate resin is greater than 30,000, the workability may be decreased due to insufficient fluidity.

The glass transition temperature of the polycarbonate resin is not particularly limited. However, the glass transition temperature is preferably in a range of 100° C. to 200° C., and more preferably in a range of 120° C. to 180° C. If the glass transition temperature of the polycarbonate resin is less than 100° C., heat resistance may be insufficient, and if the glass transition temperature of the polycarbonate resin is greater than 200° C., workability may be insufficient.

If the polycarbonate resin is contained, the content of the polycarbonate resin is preferably in a range of 50% by weight to 95% by weight with respect to the total weight of the resin component, and is more preferably in a range of 70% by weight to 90% by weight. If the content of the polycarbonate resin is less than 50% by weight, sufficient flame retardance may not be obtained, and if the content of the polycarbonate resin is greater than 95% by weight, workability may decrease due to insufficient fluidity.

Other Additives

In the resin composition according to the exemplary embodiment, if necessary, other additives such as a flame retardant, an antioxidant, a filler, and a drip preventing agent may be used. The content of each of the other components is preferably 20% by weight or less based on the total amount of the solid content of the resin composition.

By containing a flame retardant in the resin composition according to the exemplary embodiment, the flame retardance when being formed into a molded article is enhanced. As the flame retardant, a product generally used as the flame retardant for the resin may be used, and the flame retardant is not particularly limited. Examples thereof include an inorganic flame retardant and an organic flame retardant. Specific examples of the inorganic flame retardant include a silica-based flame retardant such as magnesium hydroxide, aluminum hydroxide, silicon dioxide, and low meting point glass, and specific examples of the organic flame retardant include a phosphate compound and a phosphoric ester compound. Examples of the flame retardant used in the exemplary embodiment are described above, but in view of the flame retardance efficiency, phosphate compound, and particularly, polyphosphoric acid ammonium is preferable. The flame retardant may be used singly, but two or more types thereof may be used in combination.

Examples of the antioxidant include a phenol-based antioxidant, an amine-based antioxidant, a phosphorus-based antioxidant, a sulfur-based antioxidant, hydroquinone-based antioxidant, and a quinoline-based antioxidant. The antioxidant may be used singly, or two or more types thereof may be used in combination.

Examples of the filler include clay such as kaoline, bentonite, kibushi clay, and gaerome clay, talc, mica, and montmorillonite. The filler may be used singly, or two or more types thereof may be used in combination.

By containing the drip preventing agent in the resin composition according to the exemplary embodiment, anti-drip (melting and dripping) properties when being formed into a molded article are enhanced. As the drip preventing agent, a synthesized product or a commercially available product may be used. Examples of the commercially available product include "PTFE CD145" manufactured by Asahi Glass Co., Ltd. which is polytetrafluoroethylene, and "FA500H" manufactured by Daikin Industries Ltd. The drip preventing agent may be used singly, or two or more types thereof may be used in combination.

Various Measurement Methods

Contents of the acrylonitrile-styrene copolymer resin and the polycarbonate resin in the resin composition are measured by the 1H-NMR analysis. Contents of the acrylonitrile-styrene copolymer resin and the polycarbonate resin in the resin molded article obtained by using the resin composition are measured by the 1H-NMR analysis. The contents of the acrylonitrile-styrene copolymer resin and the polycarbonate resin in the resin composition may be estimated from the contents of the acrylonitrile-styrene copolymer resin and the polycarbonate resin in the resin molded article which are measured in this manner.

The weight-average molecular weights of the acrylonitrile-styrene copolymer resin and the polycarbonate resin in the resin composition are obtained by dissolving the polymers in a solvent, and performing size-exclusion chromatography (GPC) with the solution. The polymers are dissolved in tetrahydrofuran (THF) to be analyzed by the molecular weight distribution measurement (GPC). The weight-average molecular weights of the acrylonitrile-styrene copolymer resin and the polycarbonate resin in the resin molded article obtained by using the resin composition are obtained by dissolving the polymers in a solvent, and performing size-exclusion chromatography (GPC) with the solution. The polymers are dissolved in tetrahydrofuran (THF) to be analyzed by the molecular weight distribution measurement (GPC).

The glass transition temperatures of the acrylonitrile-styrene copolymer resin and the polycarbonate resin in the resin composition are measured by a method of JIS K 7121 using a thermal analyzer (DSC6000 manufactured by SII NanoTechnology). The glass transition temperatures of the acrylonitrile-styrene copolymer resin and the polycarbonate resin in the resin molded article obtained by using the resin composition are measured by a method of JIS K 7121 using a thermal analyzer (DSC6000 manufactured by SII Nano-Technology).

With respect to the resin composition and the resin molded article obtained by using the resin composition, contents of the butadiene rubber particles, other additives, and the like in the resin composition and the resin molded article are measured by measuring structures or composition ratios of respective materials with an element analyzer, an NMR apparatus, an IR apparatus, and the like. In addition, contents of the butadiene rubber particles, other additives, and the like in the resin composition may be evaluated from the contents of the butadiene rubber particles, other additives, and the like in the resin molded article.

An average particle diameter of the butadiene rubber particles in the resin molded article obtained by using the resin composition is measured by particle analysis utilizing an image by using a transmission electron microscope (TEM) (HF-3300 manufactured by Hitachi High-Technologies Corporation). The average particle diameter of the butadiene rubber particles in the resin composition is evaluated from the average particle diameter of the butadiene rubber particles in the resin molded article measured in this manner.

The content of butadiene in the butadiene rubber particles in the resin composition is measured by a method of calculating composition ratios of respective monomers based on spectral peaks of a solvent for measurement by using a nuclear magnetic resonance spectrum device (AVANCE III HD manufactured by Hitachi High-Technologies Corporation).

Method of Manufacturing Resin Composition

The resin composition according to the exemplary embodiment may be manufactured by kneading, for example, butadiene rubber particles, an acrylonitrile-styrene copolymer resin, and, if necessary, other components.

For example, kneading may be performed by using a well-known kneading apparatus such as a twin screw kneader (TEM58SS manufactured by Toshiba Machine Co., Ltd.) and a simple kneader (Labo Plastomill manufactured by Toyo Seiki Seisaku-Sho, Ltd.). Here, for example, the temperature condition of the kneading (cylinder temperature condition) is preferably in a range of 170° C. to 220° C., and more preferably in a range of 180° C. to 220° C., and most preferably in a range of 190° C. to 220° C. Accordingly, it is possible to easily obtain a molded article having excellent fatigue resistance and excellent impact resistance.

Resin Molded Article

The resin molded article according to the exemplary embodiment is obtained by molding the resin composition according to the exemplary embodiment as described above.

For example, the resin molded article according to the exemplary embodiment is obtained by molding the resin composition by using molding methods such as injection molding, extrusion molding, blow molding, and hot press molding. For the reason of productivity, it is preferable that the resin molded article is obtained by injection-molding the resin composition according to the exemplary embodiment.

For example, the injection molding may be performed by using commercially available apparatuses such as "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd. At this point, in view of prevention of the resin from degradation, the cylinder temperature is preferably in a range of 170° C. to 250° C., and more preferably in a range of 180° C. to 240° C. In addition, in view of productivity, the mold temperature is preferably in a range of 30° C. to 100° C., and more preferably in a range of 30° C. to 60° C.

The resin molded article according to the exemplary embodiment has excellent fatigue resistance and excellent impact resistance.

Component of Electrical and Electronic Apparatus

Since the resin molded article according to the exemplary embodiment may have excellent mechanical strength (impact resistance, elastic modulus in tension, and the like), the resin molded article is appropriately used for electrical and electronic apparatuses, home appliances, containers, and interior materials for automobiles. More specifically, examples of the usage include housings, various components, or the like for home appliances or electrical and electronic apparatuses, wrapping films, storage cases of CD-ROM, DVD, or the like, tableware, food trays, drink bottles, and medicine wrapping materials. Among these, the resin molded article according to the exemplary embodiment is preferably used for components for electrical and electronic apparatuses. Specifically, since the components for electrical and electronic apparatuses have complicated shapes in many cases, and are heavy products, the components for electrical and electronic apparatuses require high impact resistance compared with the case in which the components are not heavy products. However, the resin molded article according to the exemplary embodiment sufficiently satisfies such requirements. The resin molded article according to the exemplary embodiment is particularly preferably used for housings for image forming apparatuses or copying machines.

EXAMPLES

Hereinafter, the invention is more specifically described with reference to examples and comparative examples. However, the invention is not limited the examples.

EXAMPLES AND COMPARATIVE EXAMPLES

Raw materials in compositions (parts by weight) described in Tables 1 and 2 are blended, the raw materials are put into a twin screw kneader (TEM58SS manufactured by Toshiba Machine Co., Ltd.), and the raw materials are kneaded at a cylinder temperature of 200° C. to obtain resin compositions (compound). Subsequently, test samples are obtained by molding the obtained resin compositions in an injection molding apparatus (NEX150E manufactured by Nissei Plastic Industrial Co., Ltd.) at a cylinder temperature of 190° C. and a mold temperature of 100° C. With respect to the respective components presented in Tables 1 and 2, product names and manufacturers' names are presented in Table 3.

Evaluation Method

Impact Strength (Impact Resistance Evaluation)

Charpy impact resistance strength (kJ/m2) is measured with products obtained by performing notch processing on ISO multipurpose dumbbell test samples according to a method regulated by ISO-179 by an impact resistance testing apparatus (DG-5 manufactured by Toyo Seiki Seisaku-Sho, Ltd.). Evaluation is performed based on criteria described below. Results are presented in Tables 1 and 2.

A: 30 or greater

B: 12 or greater and less than 30

C: 8 or greater and less than 12

D: Less than 8

Bending fatigue test (fatigue resistance evaluation)

Bending fatigue tests are performed by using a test sample of ASTM D671 Type A according to a method regulated in ASTM D671-63TB by a bending fatigue testing apparatus (B50TL manufactured by Toyo Seiki Seisaku-Sho, Ltd.) to evaluate the number of times of break at a load stress of 14.7 MPa based on the criteria described below. The results thereof are presented in Tables 1 and 2.

A: 300,000 times or greater

B: 150,000 times or greater and less than 300,000 times

C: 100,000 times or greater and less than 150,000 times

D: Less than 100,000 times

Workability

Workability in molding by an injection molding apparatus is evaluated based on the criteria described below.

◯: Test samples to be used in respective evaluations can be molded

X: Test samples to be used in respective evaluations cannot be molded

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Acrylonitrile-styrene copolymer resin | A1 | 80 parts by weight | 80 parts by weight | 80 parts by weight | 80 parts by weight | 80 parts by weight | 98 parts by weight | 20 parts by weight | 95.5 parts by weight | 10 parts by weight | 16 parts by weight |
| Rubber particles | B1 | 20 parts by weight | | | | | | | | | |
| | B2 | | 20 parts by weight | | | | | | | | |
| | B3 | | | 20 parts by weight | | | 2 parts by weight | 80 parts by weight | 0.5 parts by weight | 90 parts by weight | 4 parts by weight |
| | B4 | | | | 20 parts by weight | | | | | | |
| | B5 | | | | | 20 parts by weight | | | | | |
| | B6 | | | | | | | | | | |
| | B7 | | | | | | | | | | |
| | B8 | | | | | | | | | | |
| Polycarbonate resin | C1 | | | | | | | | | | 80 parts by weight |
| Charpy impact strength [kJ/m²] | | A | B | B | A | C | C | C | D | — | A |
| Fatigue resistance | | B | B | A | C | A | C | C | D | — | A |
| Workability | | ◯ | ◯ | ◯ | ◯ | ◯ | ◯ | ◯ | ◯ | X | ◯ |

TABLE 2

| | | Comparative Example 1 | Comparative Example 2 | Comparative Example 3 |
|---|---|---|---|---|
| Acrylonitrile-styrene copolymer resin | A1 | 80 parts by weight | 80 parts by weight | 80 parts by weight |
| Rubber particles | B1 | | | |
| | B2 | | | |
| | B3 | | | |
| | B4 | | | |
| | B5 | | | |
| | B6 | 20 parts by weight | | |
| | B7 | | 20 parts by weight | |
| | B8 | | | 20 parts by weight |
| Polycarbonate resin | C1 | | | |
| Charpy impact strength [kJ/m²] | | A | D | D |
| Fatigue resistance | | D | A | B |
| Workability | | ◯ | ◯ | ◯ |

TABLE 3

| | Name | Vendor | Remark |
|---|---|---|---|
| Acrylonitrile-styrene copolymer resin | A1 | — | — | Weight-average molecular weight: 90,000 |
| Rubber particles | B1 | — | — | Butadiene average particle diameter: 1.2 μm<br>Butadiene component proportion ratio: 90% or greater |
| | B2 | — | — | Butadiene average particle diameter: 1.5 μm<br>Butadiene component proportion ratio: 90% or greater |
| | B3 | — | — | Butadiene average particle diameter: 1.8 μm<br>Butadiene component proportion ratio: 90% or greater |
| | B4 | — | — | Butadiene average particle diameter: 1.0 μm<br>Butadiene component proportion ratio: 90% or greater |
| | B5 | — | — | Butadiene average particle diameter: 2.0 μm<br>Butadiene component proportion ratio: 90% or greater |
| | B6 | — | — | Butadiene average particle diameter: 0.8 μm<br>Butadiene component proportion ratio: 90% or greater |
| | B7 | — | — | Butadiene average particle diameter: 2.2 μm<br>Butadiene component proportion ratio: 90% or greater |
| | B8 | — | — | Acrylonitrile-butadiene rubber-styrene average particle diameter: 1.5 μm<br>Butadiene component proportion ratio: 75% |
| Polycarbonate resin | C1 | PC-122 | Asahi Kasei Corporation | Weight-average molecular weight: 39,000 |

In this manner, the resin compositions of the examples exhibit excellent fatigue resistance and excellent impact resistance when being formed into a molded article, compared with the resin compositions of comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin molded article comprising a resin composition, the resin composition comprising:
   butadiene rubber particles having an average particle diameter in a range of 1 μm to 2 μm; and
   an acrylonitrile-styrene copolymer resin,
   wherein the resin molded article is at least one selected from the group consisting of a storage case for CD-ROM or DVD, tableware, a food tray, and a drink bottle,
   wherein a content of butadiene in the butadiene rubber particles is 90% by weight or greater with respect to the total constituent of the butadiene rubber particles, and
   wherein a content of the butadiene rubber particles is in a range of 2% by weight to 20% by weight with respect to the content of the acrylonitrile-styrene copolymer resin.

2. The resin molded article according to claim 1, wherein a content of the butadiene rubber particles is 20% by weight with respect to the content of the acrylonitrile-styrene copolymer resin.

3. The resin molded article according to claim 1, wherein a weight-average molecular weight of the acrylonitrile-styrene copolymer resin is in a range of 50,000 to 150,000.

4. The resin molded article according to claim 1, wherein a glass transition temperature of the acrylonitrile-styrene copolymer resin is in a range of 100° C. to 130° C.

5. The resin molded article according to claim 1, wherein the butadiene rubber particles have an average particle diameter in a range of 1.2 μm to 1.8 μm.

6. The resin molded article according to claim 1, wherein a content of butadiene in the butadiene rubber particles is 100% by weight or greater with respect to the total constituent of the butadiene rubber particles.

7. The resin molded article according to claim 1, wherein a content of the butadiene rubber particles is in a range of 8% by weight to 20% by weight with respect to the content of the acrylonitrile-styrene copolymer resin.

8. The resin molded article according to claim 1, further comprising a polycarbonate resin.

9. A resin molded article comprising a resin composition, the resin composition comprising:
   butadiene rubber particles having an average particle diameter in a range of 1 μm to 2 μm; and
   an acrylonitrile-styrene copolymer resin,
   wherein the resin molded article is at least one selected from the group consisting of an electrical good, an electrical or electronic apparatus, a home appliance, a container, an interior material for automobiles, a housing, a wrapping film, a storage case for CD-ROM or DVD, tableware, a food tray, a drink bottle, and a medicine wrapping material,
   wherein a content of butadiene in the butadiene rubber particles is 90% by weight or greater with respect to the total constituent of the butadiene rubber particles,
   wherein a content of the butadiene rubber particles is in a range of 2% by weight to 20% by weight with respect to the content of the acrylonitrile-styrene copolymer resin, and
   wherein the content of the acrylonitrile-styrene copolymer resin and the butadiene rubber particles is 100% by weight with respect to the total content of the resins and particles in the composition.

* * * * *